(12) United States Patent
Richards et al.

(10) Patent No.: US 7,358,623 B2
(45) Date of Patent: Apr. 15, 2008

(54) GENERATOR

(75) Inventors: Malcolm Colin Richards, Hucknall (GB); Bernard John Sheridan, deceased, late of South Clifton (GB); by Margaret Sheridan, legal representative, South Clifton (GB); Anthony Whitham, Burton Joyce (GB)

(73) Assignee: Intec Power Holdings Limited, Old Basford, Nottingham (GB)

( * ) Notice: Subject to any disclaimer, the term of this patent is extended or adjusted under 35 U.S.C. 154(b) by 0 days.

(21) Appl. No.: 10/559,591

(22) PCT Filed: Jun. 1, 2004

(86) PCT No.: PCT/GB2004/002353

§ 371 (c)(1),
(2), (4) Date: May 9, 2006

(87) PCT Pub. No.: WO2004/109103

PCT Pub. Date: Dec. 16, 2004

(65) Prior Publication Data

US 2007/0018462 A1   Jan. 25, 2007

(30) Foreign Application Priority Data

Jun. 5, 2003 (GB) .................................. 0312903.8

(51) Int. Cl.
*F03D 3/02* (2006.01)

(52) U.S. Cl. ....................................................... 290/55
(58) Field of Classification Search ................. 290/44, 290/55

See application file for complete search history.

(56) References Cited

U.S. PATENT DOCUMENTS 2,542,522 A    2/1951   Hings
3,697,765 A   10/1972   Carini
4,061,926 A   12/1977   Peed
6,172,429 B1   1/2001   Russell
6,249,058 B1 *  6/2001   Rea .............................. 290/55
2003/0006614 A1 *  1/2003   Appa ........................... 290/55

(Continued)

FOREIGN PATENT DOCUMENTS

DE    19643362 A1 *  4/1998

(Continued)

OTHER PUBLICATIONS

PCT International Search Report, PCT/GB2004/002353, dated Sep. 10, 2004, 4 pages.

(Continued)

*Primary Examiner*—Joseph Waks
(74) *Attorney, Agent, or Firm*—Harness, Dickey & Pierce, P.L.C.

(57) ABSTRACT

A wind powered generator that includes first and second current generators arranged to generate electric current in response to relative rotation between the two current generators. At least one rotary part having vanes is operatively connected to one of the first and second current generators and arranged to rotate in a first direction around an axial shaft when exposed to a flow of air perpendicular to the shaft. The axial shaft is configured to receive electrical connections therethrough. The electrical connections are configured to provide an electrical connection between the current generators and an electrical generator.

12 Claims, 12 Drawing Sheets

U.S. PATENT DOCUMENTS

2003/0133782 A1    7/2003   Holter et al.

FOREIGN PATENT DOCUMENTS

| | | |
|---|---|---|
| DE | 19828324 | 12/1999 |
| FR | 2 841 605 | 1/2004 |
| GB | 2 341 646 | 3/2000 |
| WO | WO 9008881 | 8/1990 |
| WO | WO 2004/109102 | 12/2004 |

OTHER PUBLICATIONS

PCT Written Opinion of the International Searching Authority, PCT/GB2004/002353, dated Sep. 10, 2004, 7 pages.

PCT International Search Report, PCT/GB2004/002352, dated Sep. 10, 2004, 4 pages.

PCT Written Opinion of the International Searching Authority, PCT/GB2004/002352, dated Sep. 10, 2004, 5 pages.

* cited by examiner

GENERATOR

BACKGROUND OF THE INVENTION

1. Field of the Invention

The present invention relates to a generator, in particular a wind powered generator.

2. Description of the Related Art

A first type of wind powered generator utilizes a bladed rotor mounted on a vertical post. The rotor is configured to rotate about an axis of rotation when exposed to air flowing in a direction along that axis of rotation.

A second type of wind powered generator utilizes a bladed rotor configured to rotate about an axis of rotation when exposed to air flowing in a direction perpendicular to that axis of rotation.

A wind, powered generator of this second type is disclosed in United Kingdom Patent number 2 341 646 B

BRIEF SUMMARY OF THE INVENTION

According to a first aspect of the present invention there is provided a generator for generating an electric current comprising current generating means comprising first generator means and second generator means arranged to generate electric current in response to relative rotation between said first and second generator means; a first rotary part having vanes, said first rotary part arranged to rotate in a first direction around an axis when exposed to a flow of air perpendicular to said axis; said first rotary part operatively connected to a first of said first and second generator means; and said axis is through an axial shaft about which said rotary part is arranged to rotate, wherein said axial shaft is configured to receive electrical connection means therethrough, said electrical connection means configured to provide an electrical connection between said current generating means and generator electrical means.

According to a second aspect of the invention there is provided a generator wherein said axial shaft comprises sections each releasably engageable with at least one other section.

According to a third aspect of the invention there is provided a generator wherein said electrical connection means comprises sections each releasably engageable with at least one other section.

BRIEF DESCRIPTION OF THE SEVERAL VIEWS OF THE DRAWINGS

The invention will now be described by way of example only, with reference to the accompanying drawings in which.

WRITTEN DESCRIPTION OF THE BEST MODE FOR CARRYING OUT THE INVENTION

Figure 1:
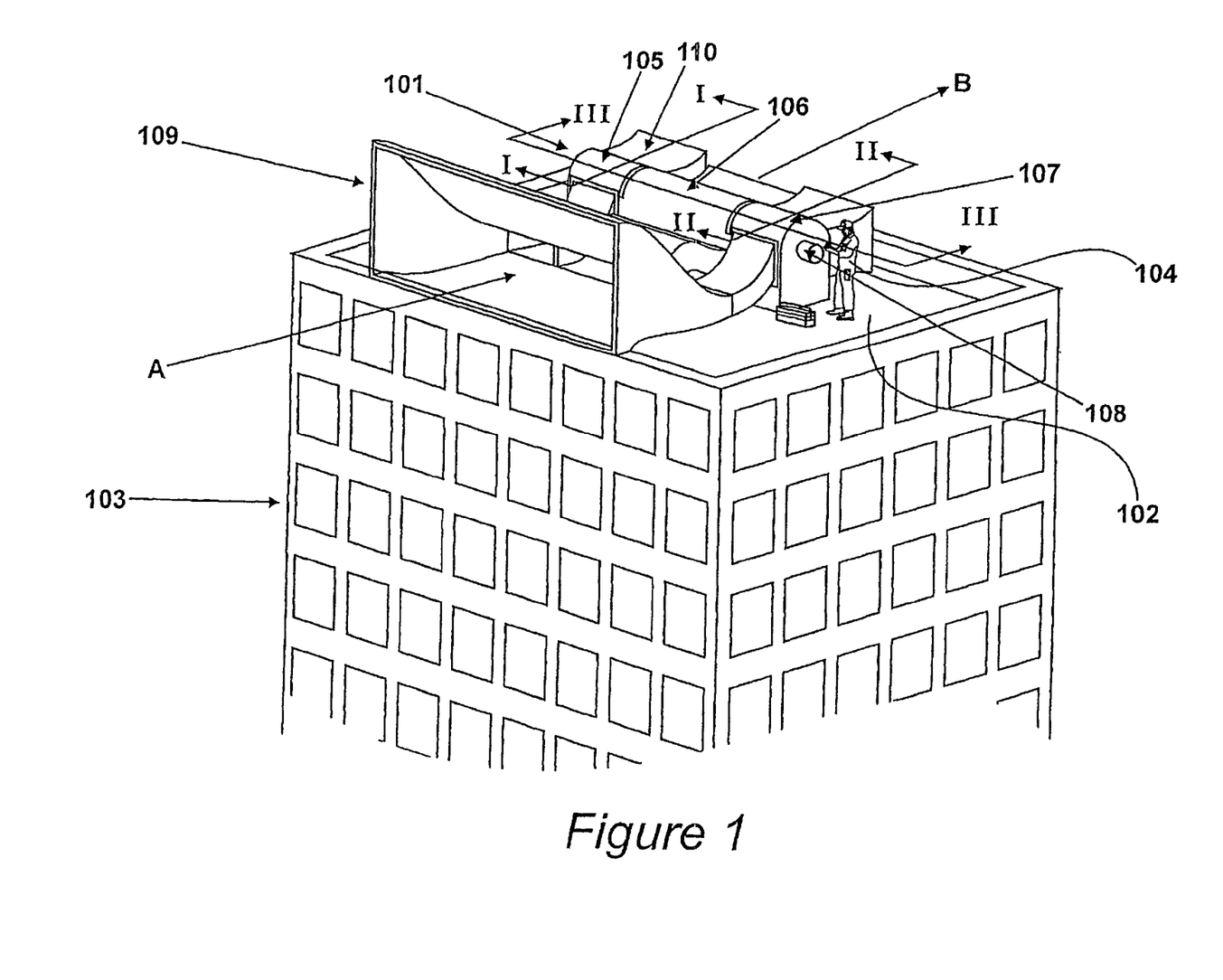
FIG. 1 shows a wind powered generator embodying the present invention.

FIG. 1

A wind powered generator 101 embodying the present invention is shown in FIG. 1. The illustrated generator 101 is configured to be positioned in a natural wind environment and, in this example, is shown situated on the roof 102 of a building 103. An engineer 104 is shown standing adjacent the wind powered generator 101, performing routine maintenance and inspection work upon the generator 101.

As shown, generator 101 comprises a first rotary section 105, a second rotary section 106, a third rotary section 107 and a generator electrical means section 108. Generator 101 is also equipped with inlet ducting means 109 and outlet ducting means 110. Air flow through the generator 101 is indicated generally by arrows A and B.

Within each of the three rotary sections 105, 106, 107 of generator 101 is a rotary part. An example of a rotary part utilisable in a wind generator embodying the present invention is shown in FIG. 2.

Figure 2:
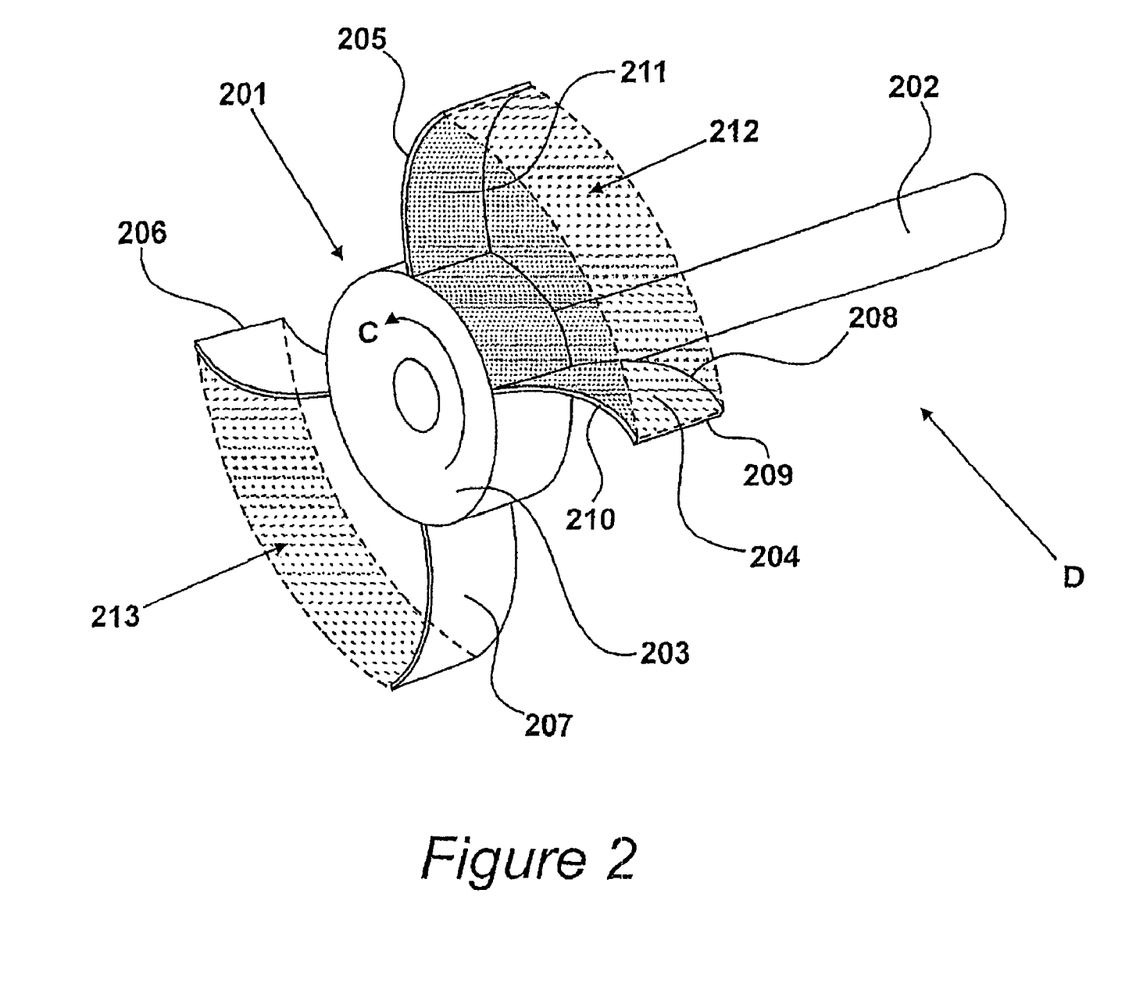
FIG. 2 shows an example of a rotary part utilisable in a wind powered generator embodying the present invention.

FIG. 2

Rotary part 201 is arranged to rotate about an axis when exposed to a flow of air perpendicular to the axis of rotation. In the example shown in FIG. 2, rotary part 201 is arranged to rotate about an axial shaft 202, and comprises a hub 203 from which four arcuate vanes 204, 205, 206, 207 extend; alternatively a rotary part having one or more vanes is utilisable. The vanes 204, 205, 206, 207 are evenly distributed about the circumference of the hub 203. Each vane 204, 205, 206, 207 has three free edges, for example, edges 208, 209 and 210 of vane 204; with edges 208 and 210 being side edges, and edge 209 being the front edge, of vane 204.

Rotary part 201 is arranged to rotate in a first direction, indicated by arrow C, about axial shaft 202 when exposed to a flow of air perpendicular to axial shaft 202, in the direction indicated by arrow D; in response to rotative air impinging on the underside of a vane, for example the underside 211 of vane 205.

As rotary part 201 rotates, each vane 204, 205, 206, 207 demarcates a vane free edge path 212 and a vane front edge path 213; a vane free edge path 212 being the path the free edges of a vane 204, 205, 206, 207 travel as the rotary part 201 rotates, and a vane front edge path 213 being the path the front edge of a vane 204, 205, 206, 207 travels as the rotary part 201 rotates.

Figure 3:
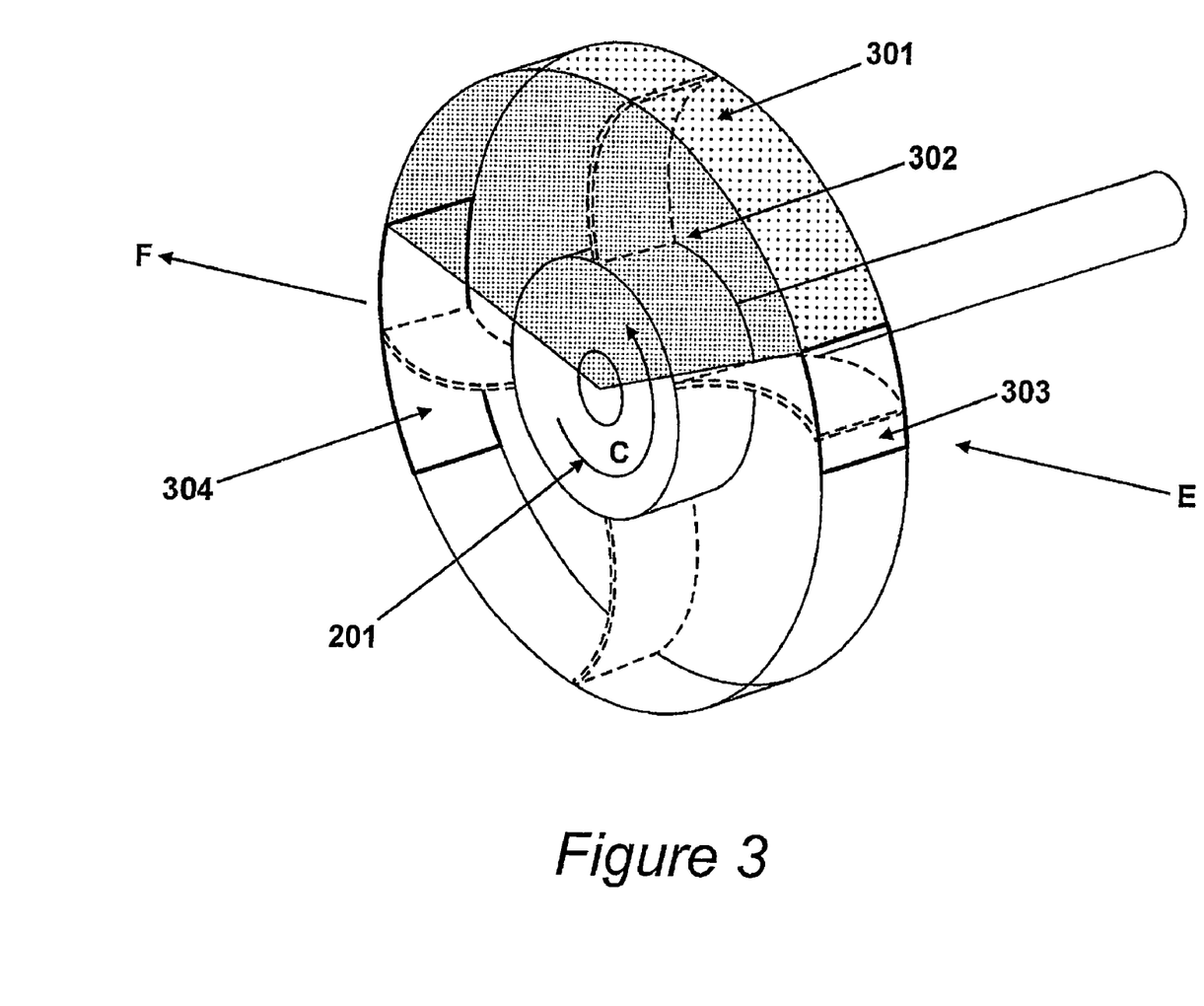
FIG. 3 shows rotary part barrier means arranged in stationary relation to the rotary part shown in FIG. 2.

FIG. 3

FIG. 3 illustrates rotary part barrier means 301 arranged in stationary relation to rotary part 201. Barrier means 301 is configured to provide a barrier sector for rotary part 201, for example barrier sector 302 comprising a barrier around a portion of the vane free edge path 212 of rotary part 201, extending between an air inlet region 303 in which a portion of the vane front edge path 213 is exposed to allow the underside of a vane 204, 205, 206, 207 to be exposed to a flow of air and an air outlet region 304 in which a portion of the vane front edge path 213 is exposed to allow the underside of a vane 204, 205, 206, 207 to be exposed following rotation through the barrier sector 302. According to the example shown in FIG. 3, as rotary part 201 rotates in the direction indicated by arrow C, inflowing air, as indicated by arrow E, flows through air inlet region 303 and is discharged through air outlet region 304, as indicated by arrow F.

In the example shown in FIG. 3, barrier means provides a second barrier sector between air outlet region 304 and air inlet region 303, in the direction indicated by arrow C. First and second portions of the free edge vane path of rotary part 201 are exposed in air inlet region 303 and air outlet region 304 respectively.

Barrier means 301 is configured to inhibit air which follows a vane 204, 205, 206, 207 rotating into a barrier sector from discharging outside of the vane free edge path 212 whilst that vane 204, 205, 206, 207 is rotating through the barrier sector in this way, the barrier means 301 functions to enhance the rotative effect of air entering the barrier sector.

In the example shown in FIG. 3, barrier means 301 is configured to provide two barrier sectors which each extend over the distance between the front edge of two vanes 204, 205, 206, 207 of rotary part 201. Thus, barrier means 301 is configured to provide two barrier sectors each of approximately ninety degrees.

Figure 4:
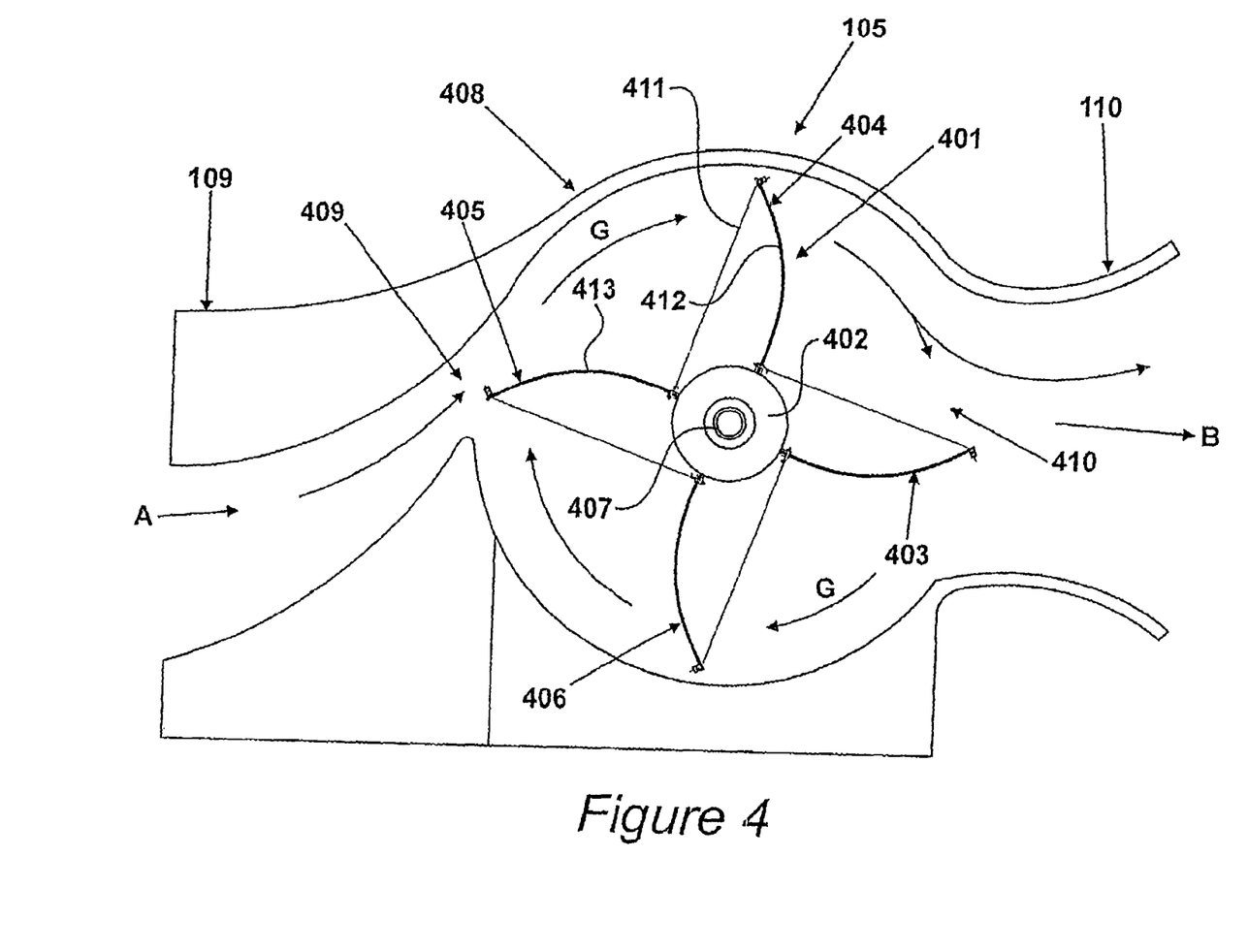
FIG. 4 shows a simplified section view, along line I-I of FIG. 1, through a first rotary section of the wind powered generator of FIG. 1.

FIG. 4

FIG. 4 shows a simplified section view, along the line I-I shown in FIG. 1, through the first rotary section 105 of wind powered generator 101. First rotary part 401, which comprises a hub 402 and four arcuate vanes 403, 404, 405, 406 extending therefrom in a similar arrangement to that of rotary part 201, is arranged to rotate about an axis of rotation through the center of axial shaft 407.

Arranged in stationary relation to rotary part 401, is barrier means 408 providing first and second barrier sectors between an air inlet region 409 and an air outlet region 410.

Inlet ducting 109 is arranged to direct inflowing air, flowing in the direction generally indicated by arrow A, towards air inlet region 409. In the illustrated example, inlet air ducting 109 is arranged to direct a flow of air through the air inlet region 409 such that the air impinges on the underside of a vane 403, 404, 405, 406 to rotate the rotary part 401 in the direction indicated by arrows F (in FIG. 4, this direction is clockwise from inlet air ducting 109 to outlet air ducting 110). Air flowing through the barrier means 408 from air inlet region 409 is discharged through air outlet region 410. Outlet air ducting 110 is arranged to direct outflowing air, flowing in the direction generally indicated by arrow B, away from air outlet region 410.

In this example, the area of air inlet region 409 is approximately half that of the area of air outlet region 410. This relationship provides for a partial vacuum to be created within the vane free edge path of rotary part 401 at the air outlet region 410, as rotary part 401 rotates in the direction indicated by arrows F; to enhance the rotative effects of air flowing from air inlet region 409.

In addition, barrier means 408 is configured to provide two barrier sectors between air inlet region 409 and air outlet region 410, in the direction indicated by arrows G, arranged to provide for a vortex to be created within the vane free edge path of rotary part 401 as rotary part 401 rotates; a vortex enhancing the rotative effects of air flowing in the vane free edge path of rotary part 401.

Rotary part 401 also comprises binding means, in the shown configuration, between the front edge of each vane 403, 404, 405, 406 and the bottom of the succeeding vane 403, 404, 405, 406, extending between the underside of the vane 403, 404, 405, 406 and the topside of the succeeding vane 403, 404, 405, 406; for example cable 411 extending between the underside 412 of vane 404 and the topside 413 of vane 405. Rotary part binding means are configurable to stabilize the relative positions of the vanes 403, 404, 405, 406, as rotary part 401 rotates, to regulate the amount of deflection experienced by the vanes 403, 404, 405, 406 as rotary part 401 rotates and/or such that a vane 403, 404, 405, 406 being acted upon by rotative air tows a succeeding vane 403, 404, 405, 406.

Figure 5:
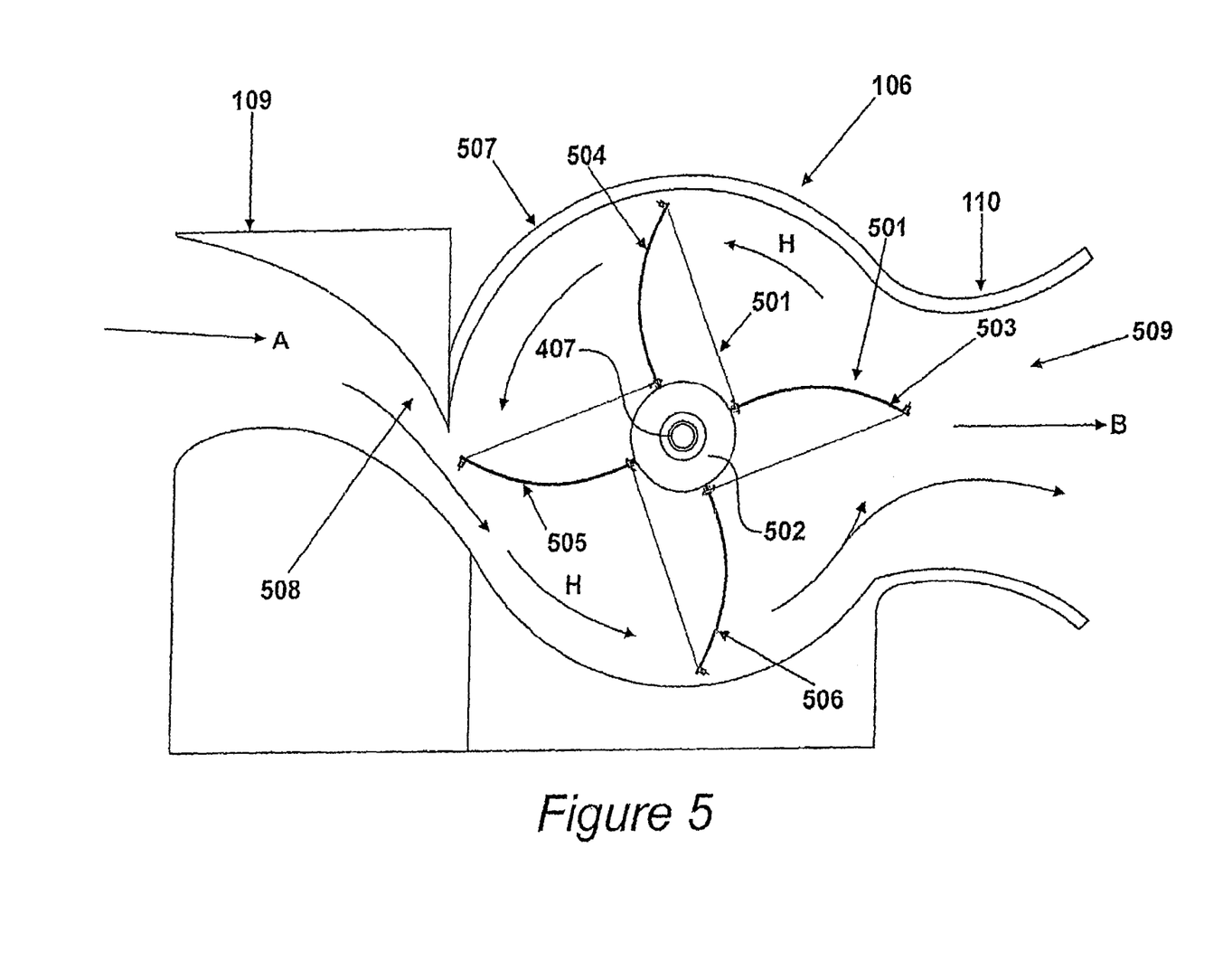
FIG. 5 shows a simplified section view, along line II-II of FIG. 1, through a second rotary section of the wind powered generator of FIG. 1.

FIG. 5

FIG. 5 shows a simplified section view, along the line II-II shown in FIG. 1 (in the same direction as along parallel line I-I), through the second rotary section 106 of wind powered generator 101. Second rotary part 501, which comprises a hub 502, four arcuate vanes 503, 504, 505, 506 extending therefrom and binding means, in a similar arrangement to that of rotary part 401. Rotary part 501 is also arranged to rotate about the same axis of rotation along the center of axial shaft 407 as rotary part 401.

Arranged in stationary relation to rotary part 501, is barrier means 507, providing first and second barrier sectors between an air inlet region 508 and an air outlet region 509. In this example, the area of air inlet region 508 is approximately half that of the area of air outlet region 509.

Inlet ducting 109 is arranged to direct inflowing air, flowing in the direction generally indicated by arrow A, towards air inlet region 508. In the illustrated example, inlet air ducting 109 is arranged to direct a flow of air through the air inlet region 508 such that the air impinges on the underside of a vane 503, 504, 505, 506 to rotate rotary part 501 in the direction indicated by arrows H (in FIG. 5, this direction is anti-clockwise from inlet air ducting 109 to outlet air ducting 110). Thus, rotary part 501 is arranged to rotate about axial shaft 407 in the opposite direction to rotary part 401 when exposed to the same air flow through the generator 101, indicated in FIGS. 1, 4 and 5 generally by arrows A and B. Air flowing through the barrier means 507 from air inlet region 508 is discharged through air outlet region 509. Outlet air ducting 110 is arranged to direct outflowing air, flowing in the direction generally indicated by arrow B, away from air outlet region 509.

Third rotary section 107 of wind powered generator 101 is similar in arrangement to rotary section 105, with the third rotary part (shown in FIG. 9) being similar to first rotary part 401 and arranged to rotate in the same direction about the axis of rotation along the center of axial shaft 407.

Figure 6:
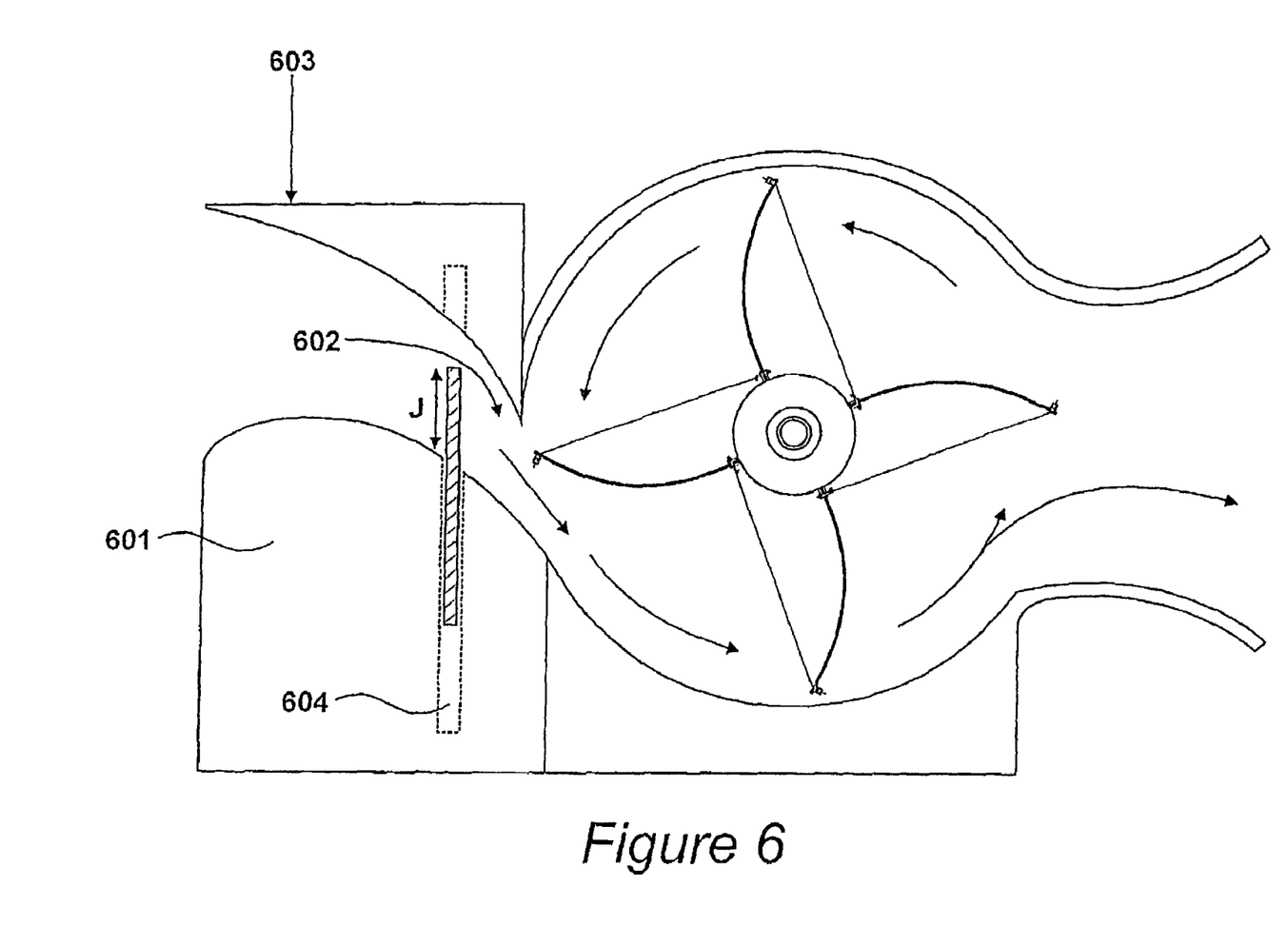
FIG. 6 shows adjustable air flow control means arranged to control the flow of air into an air inlet region of a wind powered generator embodying the present invention.

FIG. 6

Wind powered generators installed in natural wind environments are subject to fluctuations in the inflowing air flow.

FIG. 6 shows the same arrangement as shown in FIG. 5, with the addition of adjustable air flow control means 601, configured to provide a means of regulating the flow of air into air inlet region 602. In this example, air flow control means 601 is a screen configured to be moveable in the directions indicated by double-headed arrow J, between a fully open position, in which the air flow through air inlet region 602 is unrestricted by the air flow control means 601, and a fully closed position, in which the air flow control means 601 prevents the inflow of air from the inlet air ducting 603 through air inlet region 602. In the example shown in FIG. 6, inlet air ducting 603 is configured to receive the air flow control means screen 601 in a channel 604 formed therein. Alternative embodiments of air flow control means include shutters and venetian blind style arrangements.

Figure 7:
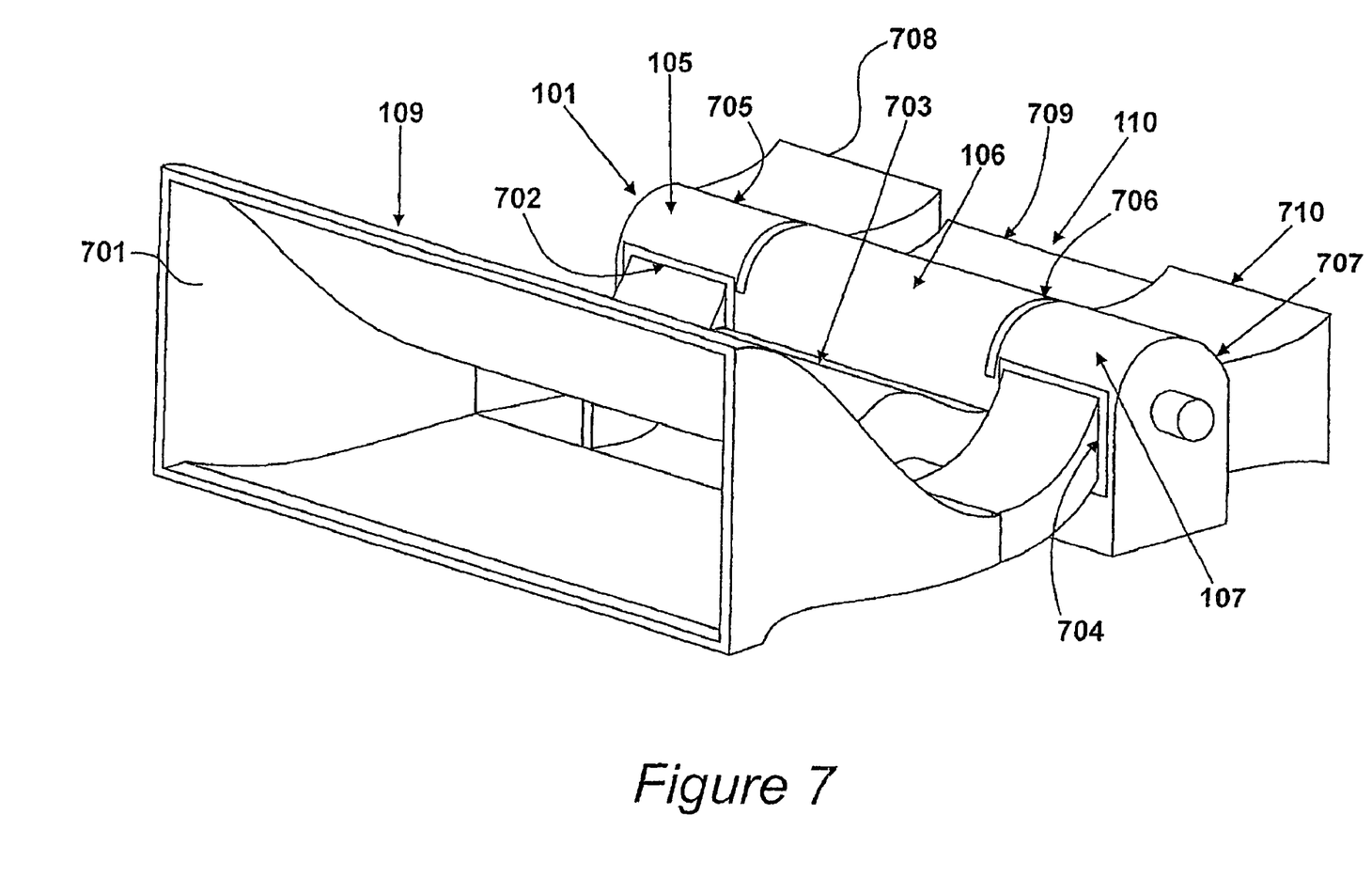
FIG. 7 shows an enlarged view of the wind powered generator shown in FIG. 1.

FIG. 7

As shown in FIG. 7, which shows an enlarged view of wind powered generator 101, inlet air ducting 109 is arranged to have an inlet 701, allowing air to flow into the inlet air ducting 109 from the natural wind environment, common to rotary sections 105, 106, 107, and an outlet 702, 703, 704 individual to each rotary section 105, 106, 107 respectively, allowing air to flow from the inlet air ducting 109 into the air inlet region of each rotary part in each rotary section 105, 106, 107. Thus, inlet air ducting 109 has a single inlet 701 common to rotary sections 105, 106, 107 and three outlets 702, 703, 704.

Alternative inlet air ducting includes ducting having an inlet common to more than one rotary section, ducting having an outlet common to more than one rotary section, ducting having an inlet and an outlet individual to a rotary section and ducting having combinations thereof.

Outlet air ducting 110 is arranged to have an inlet 705, 706, 707 allowing air to flow into the outlet air ducting 110 from the air outlet region of each rotary part in each rotary section 105, 106, 107, individual to each rotary section 105, 106, 107 respectively, and an outlet 708, 709, 710 individual to each rotary section 105, 106, 107 respectively, allowing air to flow from the outlet air ducting 110 into the natural wind environment. Thus, outlet air ducting 110 has three inlets 705, 706, 707 and three outlets 708, 709, 710.

Alternative outlet air ducting includes ducting having an inlet common to more than one rotary section, ducting having an outlet common to more than one rotary section, ducting having an inlet and an outlet individual to a rotary section and ducting having combinations thereof.

Air inlet ducting and air outlet ducting that is all or in part releasably attachable to a wind powered generator is utilisable. This feature allows for a number of wind powered generators of similar construction to be equipped with different ducting, for example according to the installation site of the wind powered generator or the wind environment, whether the wind environment is natural or not. Removable ducting provides for more convenient maintenance of, and transportation of, a wind powered generator embodying the present invention.

Air inlet ducting and outlet ducting that is configured to be adjustable is utilisable. For example, a configuration of air inlet ducting has an inlet section that is adjustable such that the inlet is directable into a flow of air.

Due to the potential variability of ducting between wind powered generators embodying the present invention, the position and construction of air flow control means is correspondingly variable. For example, alternative embodiments of air flow control means includes air flow control means individual to a rotary section, or air flow control means common to more than one rotary section. In addition, the position of air flow control means relative to a rotary section is also variable, for example, referring to inlet air ducting means 109 shown in FIG. 7, air flow control means may be positioned at each of the outlets 702, 703, 704 or may be positioned at the common inlet 701. Air flow control means may be operated manually, in response to data received from sensors, via a control program, with controls at or remote from the wind powered generator. Each air flow control means may be arranged to be adjusted independently of each other and/or in common with another.

Figure 8:
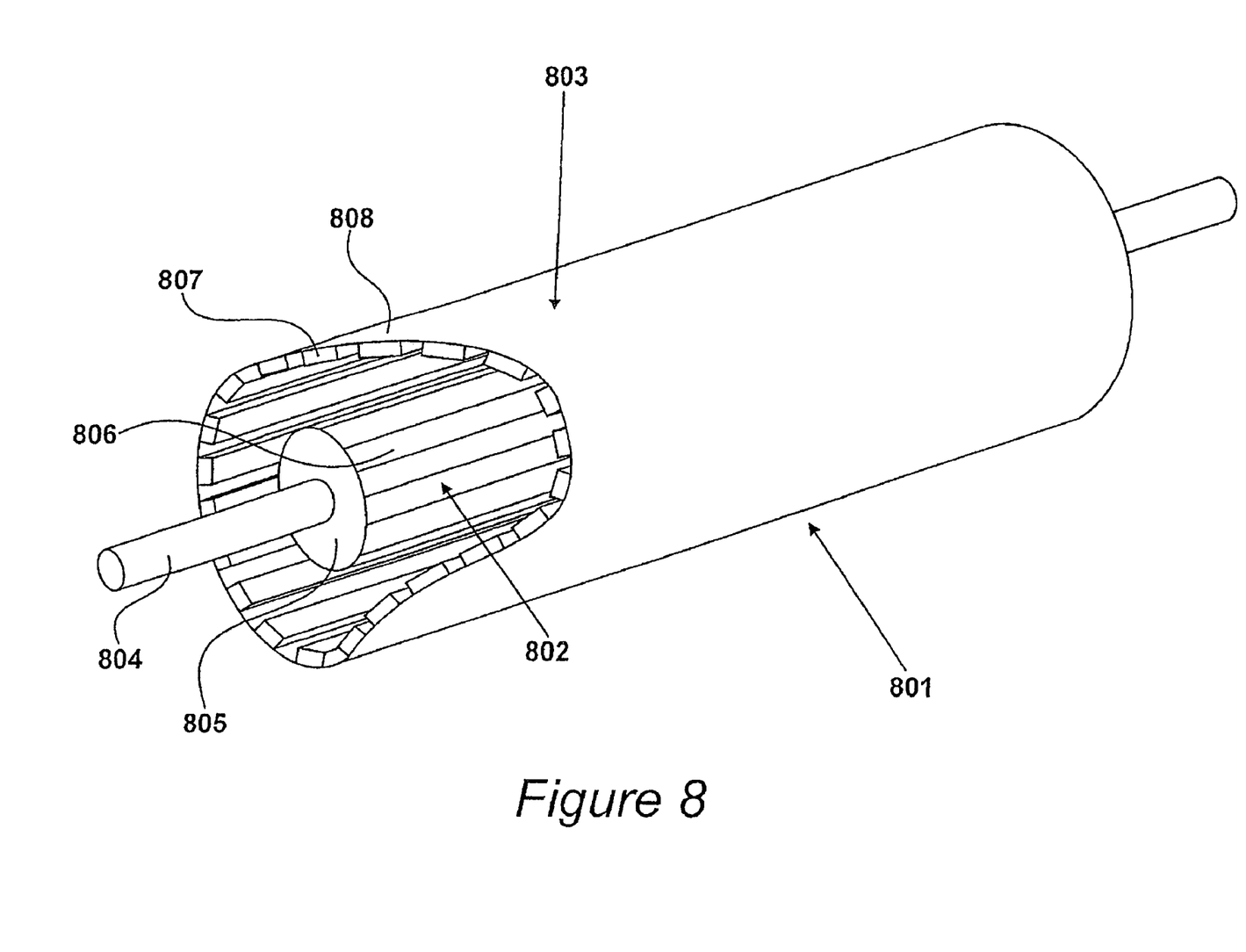
FIG. 8 shows a simplified schematic (with a cut-away section) of an arrangement of current generating means utilisable in a wind generator embodying the present invention.

FIG. 8

In a wind powered generator embodying the present invention, at least one rotary part is operatively connected to current generating means comprising generator means and second generator means arranged to generate electric current in response to relative rotation between said first and second generator means.

FIG. 8 shows a simplified schematic (with a cut-away section) of an example arrangement of current generating means utilisable in a wind generator embodying the present invention. Current generating means 801 comprises first generator means 802 and second generator means 803; in this example, first generator means 802 is fixedly mounted about an axial shaft 804 and second generator means 803 is arranged about first generator means 802, such that the first and second generator means 802, 803 are concentric about an axis of rotation along the center of axial shaft 804.

According to the shown arrangement, first generator means 802 comprises an electrical armature comprising a soft iron core 805 about which electrical windings 806 configured to carry electric current are wound, and second generator means 803 comprises a plurality of permanent magnets 807 secured in a sleeve 808. This arrangement is a sleeve arrangement, in which the permanent magnets 807 are portably held in position relative to each other.

With the arrangement shown in FIG. 8, electric current is generated in response to relative rotation between the first and second generator means 802, 803, for example in response to the rotation of one of the first and second generator means 802, 803 relative to the other of the first and second generator means 802, 803 with only one, or both, being rotatable about the axis of rotation through axial shaft 804 relative to the other.

Figure 9:
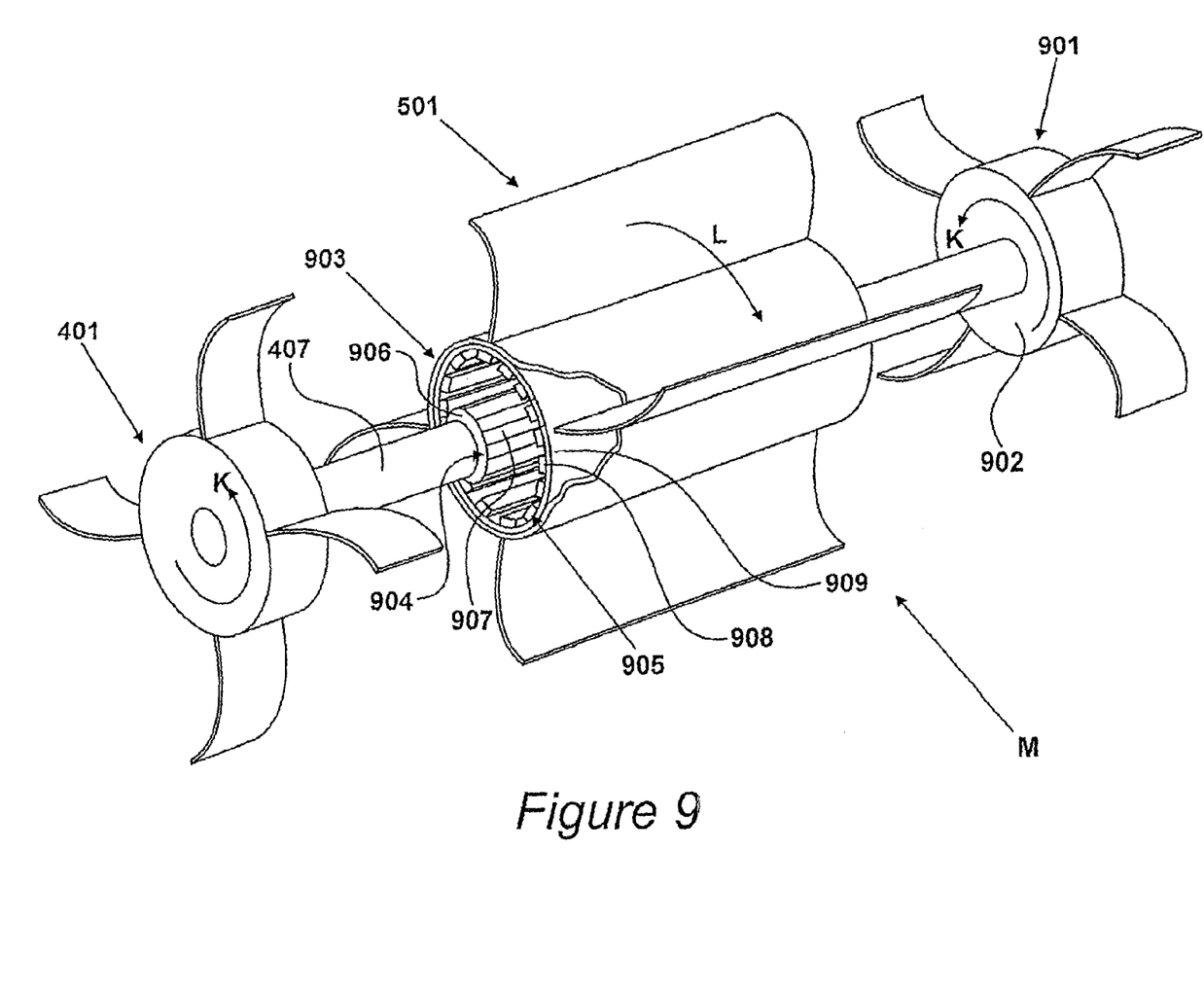
FIG. 9 shows a simplified schematic (with cut-away sections) of the arrangement of the current generating means and the rotary parts of the wind powered generator shown in FIG. 1.

FIG. 9

FIG. 9 shows a simplified schematic (with a cut-away sections) of the arrangement of the current generating means and the first, second and third rotary parts 401, 501, 901 respectively of wind powered generator 101.

As described previously, the first, second and third parts 401, 501, 901 are arranged to rotate about an axis of rotation along the center of axial shaft 407. First and third rotary parts 401, 901 are arranged to rotate in a first direction about the axis of rotation, indicated by arrows K, and second rotary part 501, which is interposed between the first and third rotary parts 401, 901, is arranged to rotate in the opposite second direction about the axis of rotation, indicated by arrow L, when the air inlet region associated with each rotary part 401, 501, 901 is exposed to a flow of air perpendicular to the axis of rotation, indicated generally by arrow M.

As shown in FIG. 9, the hub 502 of rotary part 501 is substantially hollow. Similarly, the hub 402, 902 of first and third rotary parts 401, 901 are substantially hollow. The hub of a rotary part utilised by a wind powered generator embodying the present invention may or may not be substantially hollow, for example, according to the arrangement of the rotary part relative to the generator means of the wind powered generator and/or to reduce the weight of a rotary part.

The current generating means 903 utilised in wind powered generator 101 comprises first generator means 904 and second generator means 905. First generator means 904 is mounted about axial shaft 407, within the hub 502 of second rotary part 501. Second generator means 905 is arranged within the hub of second rotary part 501, about first generator means 904, such that the first and second generator means 904, 905 are concentric about the axis of rotation through axial shaft 407.

First and third rotary parts 401, 901 are operatively connected to first generator means 904. First and third rotary parts 401, 901 are operatively connected to first generator means 904 such that as the first and third rotary parts 401, 901 rotate in a first direction about the axis of rotation, for example in the direction indicated by arrow K, first generator means 904 is rotated in the same direction. First and third rotary parts 401, 901, and first generator means 904 are fixedly mounted about axial shaft 407, such that axial shaft 407 is rotated in the same direction. According to this arrangement, axial shaft 407 is journalled on bearings provided by a support structure (not shown).

Second rotary part is operatively connected to second generator means 905. Second rotary part is operatively connected to second generator means 905 such that as the second rotary part 501 rotates in a first direction about the axis of rotation, for example in the direction indicated by arrow L, second generator means 904 is rotated in the same direction. Second rotary part 502 is mounted about axial shaft 407 such that second rotary part 502 rotates around axial shaft 407.

Thus, wind powered generator 101 is configured to provide for contra-rotation of the first and second generator means 904, 905.

In this example, first generator means 904 comprises an electrical armature comprising a soft iron core 906 about which electric windings 907 configured to carry electrical current are wound, and second generator means 905 comprises a plurality of permanent magnets 908 secured in a sleeve 909. A sleeve arrangement facilitates construction of a wind generator embodying the present invention, provides for generator means to be secured in a sleeve arrangement utilising a different material to that utilised in a rotary part, allows generator means to be secured to a rotary part indirectly, and facilitates the arrangement of a uniform air gap between first and second generator means. In this example, sleeve 909 is configured to be removably secured to second rotary part 501. Alternatively, the permanent magnets 908 may be directly secured within hub 502.

As shown in FIG. 9, the first and third rotary parts 401, 901 are mounted about axial shaft 407 such that the vanes of each rotary part 401, 901 are out of phase with each other. Associated with each of the first and third rotary sections 105, 107 is an air inlet region for each of the first and third rotary parts 401, 901, and this feature provides for a vane of either the first and third rotary parts 401, 901, to be exposed in one of these two air inlet regions at any moment in time.

Figure 10:
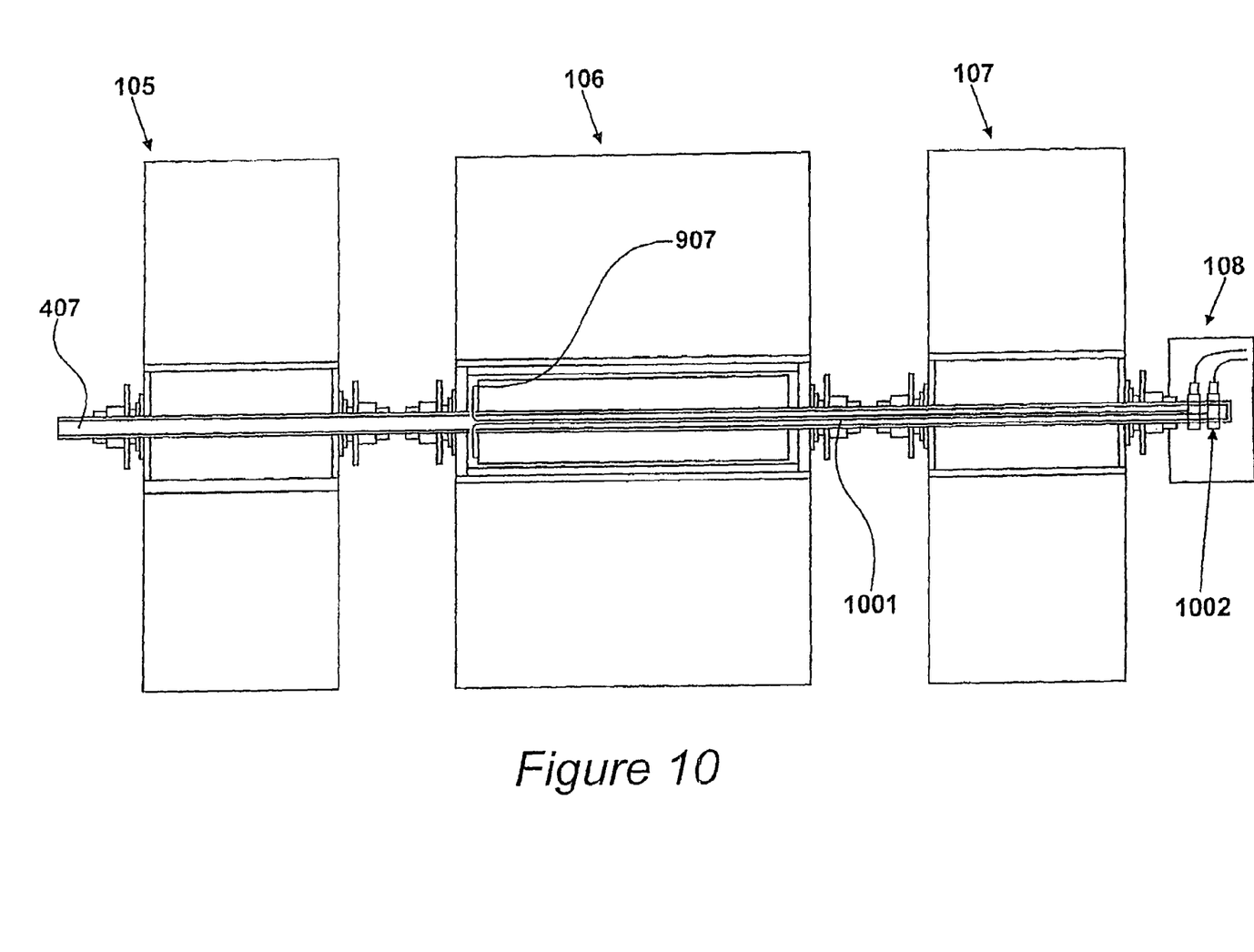
FIG. 10 is a diagrammatic longitudinal section view, along the line III-III of FIG. 1, through the wind powered generator shown in FIG. 1.

Alternatively, as shown in FIG. 10, the first and third rotary parts 401, 901 are mounted about axial shaft 407 such that the vanes of each rotary part 401, 901 are in phase with each other.

FIG. 10

FIG. 10 is a diagrammatic longitudinal section view, along the line III-III shown in FIG. 1, through the first, second and third rotary section 105, 106, 107 and the generator electrical means section 108. As shown in FIG. 10, axial shaft 407 is configured to receive electrical connection means 1001 therethrough. Electrical connection means 1001 is configured to provide an electrical connection between the current generating means 903 and generator electrical means 1002. Generator electrical means 1002 is positioned inside generator electrical means section 108, which is positioned outside of the rotary sections 105, 106, 107 of the wind powered generator 101. This feature facilitates the construction, transport and maintenance of wind powered generator 101.

In this example, the electrical connection means 1001 electrically connects the current carrying windings 907 of first generator means 904 with slip rings and brushes contained in the generator electrical means section 108. According to the shown arrangement, the electrical connection means 1001 comprises extension lengths of the windings 907 extending from the armature core 906 to the generator electrical means 1002. Alternatively, electrical connection means connected to the windings is utilisable.

As shown, electrical connection means 1001 does not extend all the way through axial shaft 407. Thus, an alternative configuration of shaft configured to receive electrical connection means therethrough is configured to receive electrical connection means through a part of the full length of the shaft.

The shown electrical arrangement utilised by wind powered generator 101 is such that alternating electric current (a.c.) is generated. Alternatively, an electrical arrangement of current generating means configured to generate direct current (d.c.) is utilisable. The components of the generator electrical means are thus variable depending on the current generating means utilised. For example, externally or self excited electromagnets may be utilised in place of permanent magnets. Shafts utilisable in a wind powered generator embodying the present invention include shafts configured to receive therethrough a single, or multiple pairs of electric current carrying connections, for example electric cables. A utilisable shaft is provided with packing material, for example electrically insulating material, to surround, cushion and/or position electrical connection means within the shaft.

Figure 11:
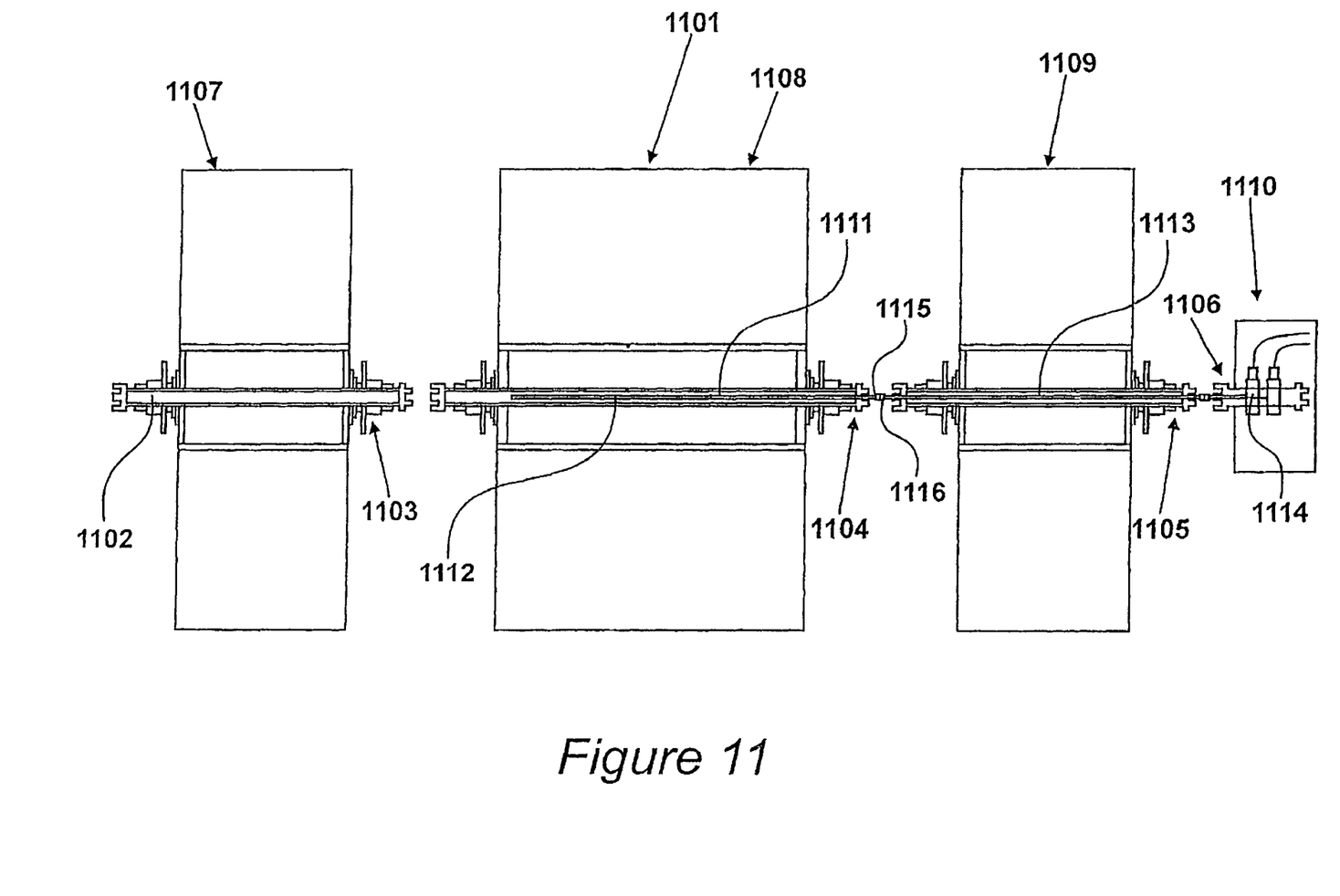
FIG. 11 is a diagrammatic longitudinal section view through a wind powered generator embodying the present invention.

FIG. 11

FIG. 11 is a diagrammatic longitudinal section view through a wind powered generator 1101 embodying the present invention. Wind powered generator 1101 is similar in construction to wind powered generator 101, configured as a modular assembly. The axial shaft 1102 is configured in first, second, third and fourth sections 1103, 1104, 1105, 1106 corresponding to first, second and third rotary sections 1107, 1108, 1109 and generator electrical means section 1110 respectively. Each section 1103, 1104, 1105, 1106 is configured to be releasably engageable with at least one other section. In the illustrated example, at least one end of each section 1103, 1104, 1105, 1106 is castellated.

Electrical connection means 1111 is also configured to be separable into sections 1112, 1113, 1114. At least one end of each section is provided with an electrical connection junction section, configured to be releasably engageable with at least one other junction section. For example, junction section 1115 of electrical connection means section 1112 is configured to be releasably engaged with junction section 1116 of electrical connection means section 1113.

This feature facilitates the transport, construction, and maintenance of wind powered generator 101, and facilitates the replacement of a section or component thereof.

Figure 12:
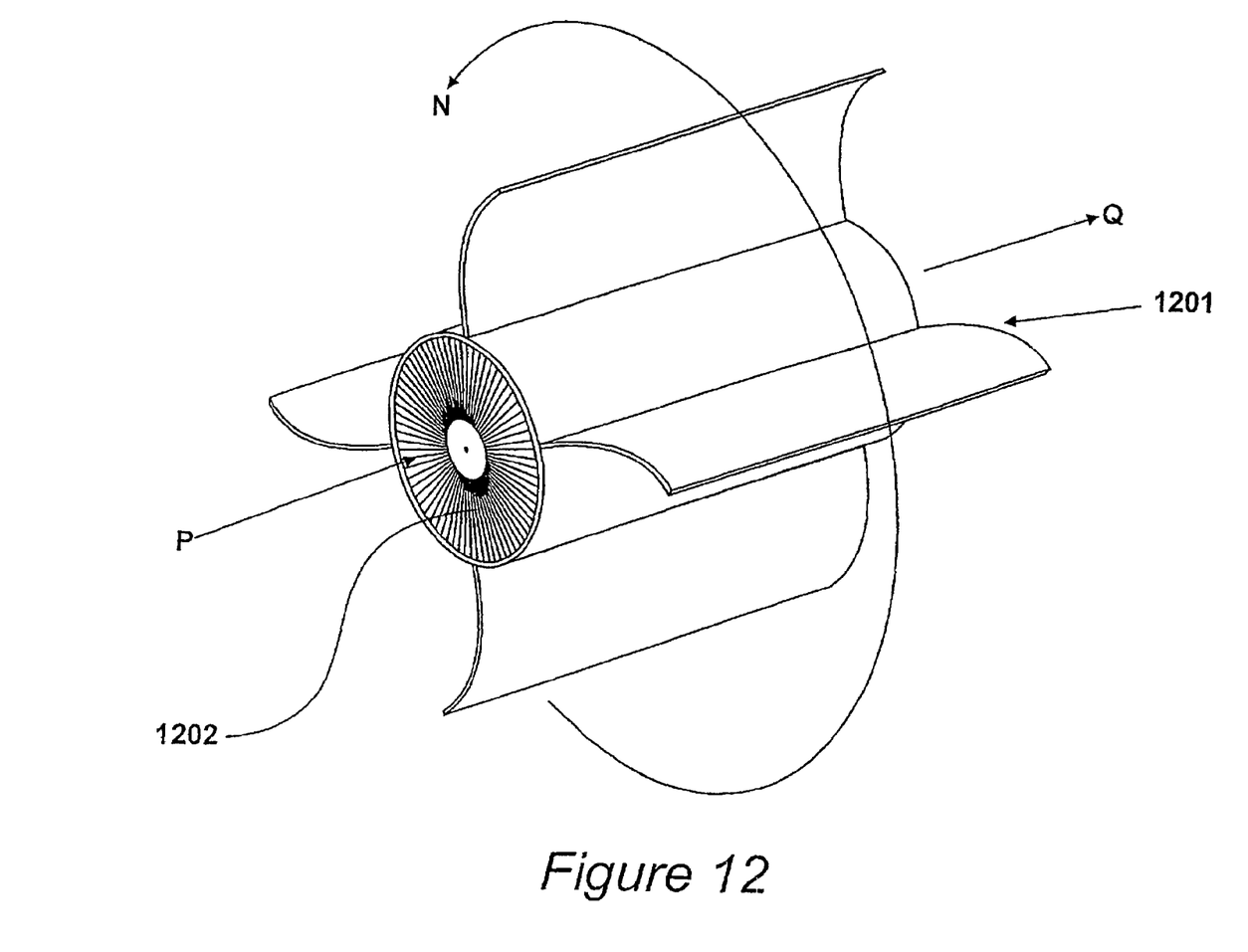
FIG. 12 shows a rotary part configured to allow air to flow therethrough during rotation, utilisable in a wind powered generator embodying the present invention.

FIG. 12

FIG. 12 shows a rotary part 1201 utilisable in a wind powered generator embodying the present invention, having a hub 1202 configured to allow air to flow through the rotary part 1201, in particular as the rotary part 1201 rotates. For example, rotary part 1201 is configured such that as rotary part 1201 rotates in the direction indicated by arrow N, air flows into the hub 1202, in the direction indicated by arrow P, through the hub 1202 and flows out of the hub 1202, in the direction indicated by arrow Q. Rotary part 1201 is configured such that as rotary part 1201 rotates in a first direction about an axis of rotation, air flows through the hub 1202 in a direction along the axis of rotation. This feature provides for air flow through the rotary part 1201, to cool any generator means or electrical connection means inside the rotary part 1201.

The invention claimed is:

1. A generator for generating an electric current comprising:
   current generating means comprising first generator means and second generator means arranged to generate electric current in response to relative rotation between said first and second generator means;
   a first rotary part having vanes, said first rotary part arranged to rotate in a first direction around an axis when exposed to a flow of air perpendicular to said axis, said first rotary part operatively connected to a first of said first and second generator means;
   said axis is through an axial shaft about which said first rotary part is arranged to rotate;
   said axial shaft is configured to receive electrical connection means therethrough, said electrical connection means configured to provide an electrical connection between said current generating means and generator electrical means;
   a further rotary part arranged to rotate in the same direction as, and operatively connected to the same generator means as, said first rotary part;
   wherein the generator is configured such that the vanes of said first rotary part and said further rotary part are out of phase with each other.

2. A generator according to claim 1, further comprising a second rotary part having vanes, said second rotary part arranged to rotate in a second opposite direction around said axis when exposed to a flow of air perpendicular to said axis; said second rotary part operatively connected to a second of said first and second generator means.

3. A generator according to claim 2, wherein said current generating means comprises generator means secured in a sleeve arrangement, said sleeve arrangement configured to be positioned inside the second rotary part such that said generator means is arranged about said axis.

4. A generator according to claim 3, wherein said sleeve arrangement comprises permanent magnets.

5. A generator according to claim 2, wherein said first rotary part and said further rotary part are arranged to rotate in said first direction and are operatively connected to said first generator means, said first generator means comprising an armature, and wherein said second rotary part is operatively connected to second generator means, said second generator means comprising permanent magnets.

6. A generator according to claim 5, in which said first and second generator means are arranged within said second rotary part.

7. A generator according to claim 1, wherein said axial shaft comprises sections each releasably engageable with at least one other section.

8. A generator according to claim 1 wherein said electrical connection means comprises sections each releasably engageable with at least one other section.

9. A generator according to claim 1 wherein at least one of said first rotary Dart and said further rotary part is configured to allow air to flow therethrough in a direction along said axis during rotation.

10. A generator according to claim 1 wherein at least one of said first rotary part and said further rotary part has a hub from which a plurality of arcuate vanes extend.

11. A generator according to claim 1 wherein at least one of said first rotary part and said further rotary part has rotary part binding means extending between two adjacent vanes.

12. A generator according to claim 1, comprising generator electrical means positioned outside of the rotary section or sections of said generator.

\* \* \* \* \*